Sept. 15, 1970   M. H. CHERIS ET AL   3,528,658
RACKET AND METHOD OF MAKING SAME
Filed March 6, 1968   3 Sheets-Sheet 1
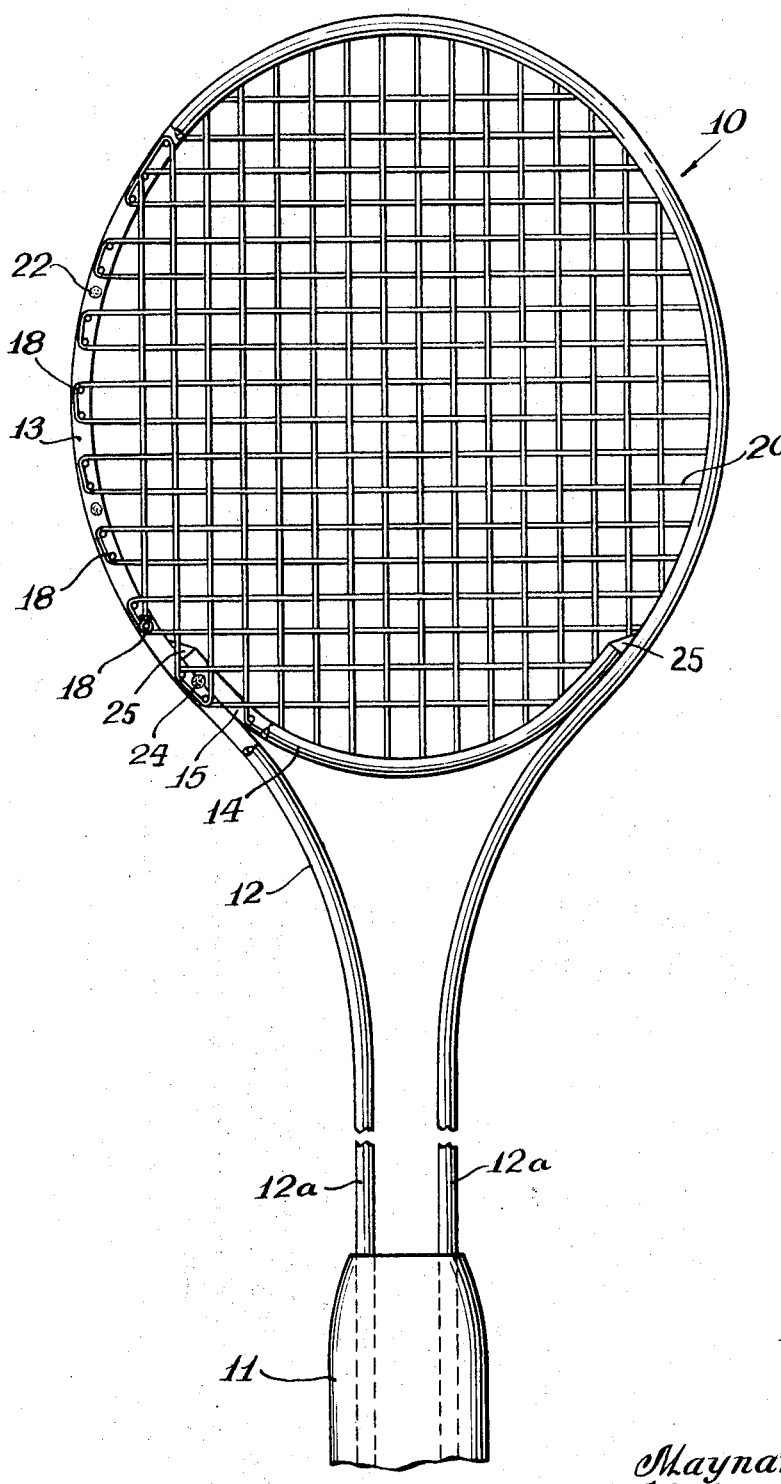
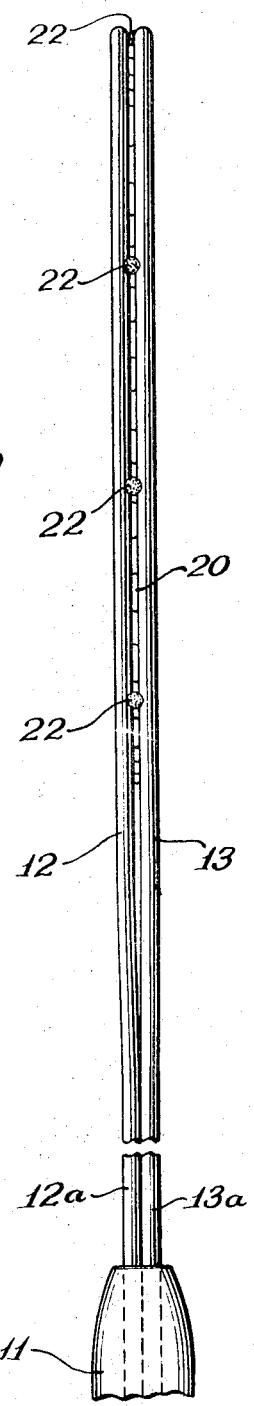
Inventor:
Maynard H. Cheris
Aloise A. Bigos
By
Attys.

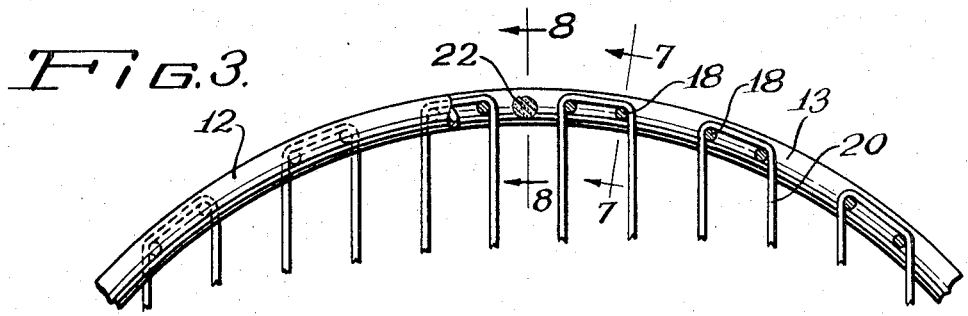
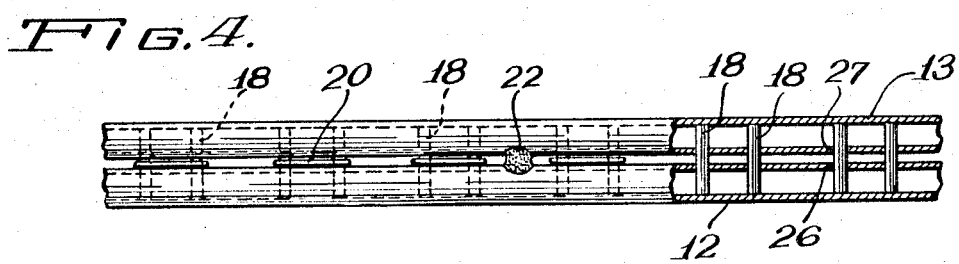
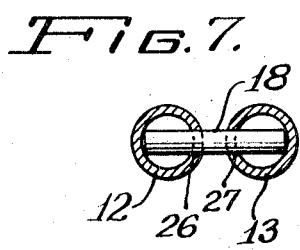
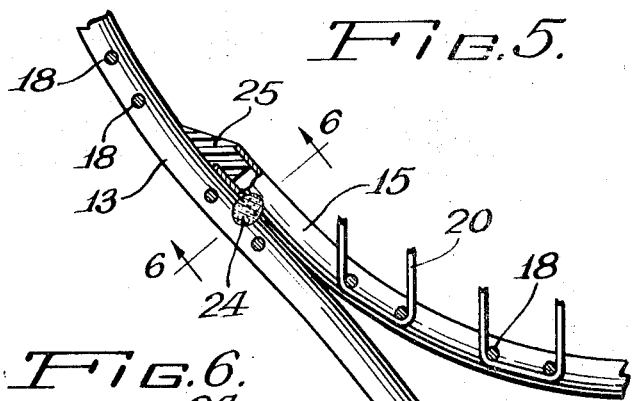
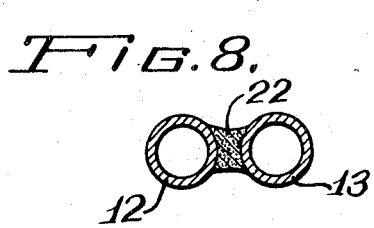
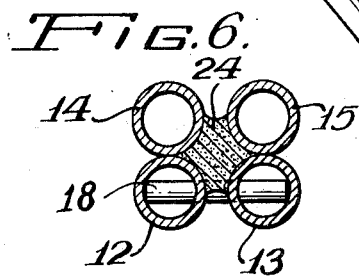
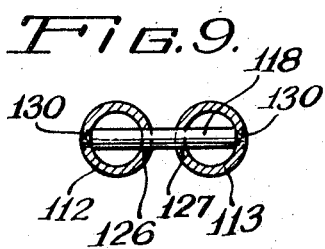
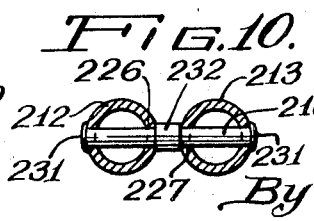
Inventors:
Maynard H. Cheris
Aloise A. Bigos Sept. 15, 1970 M. H. CHERIS ET AL 3,528,658
RACKET AND METHOD OF MAKING SAME
Filed March 6, 1968 3 Sheets-Sheet 3
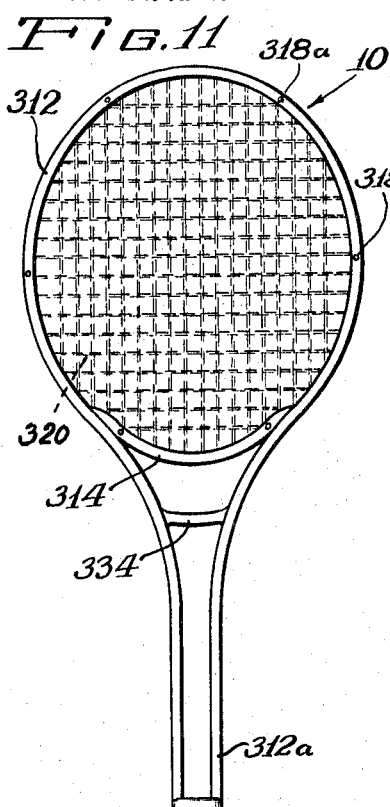
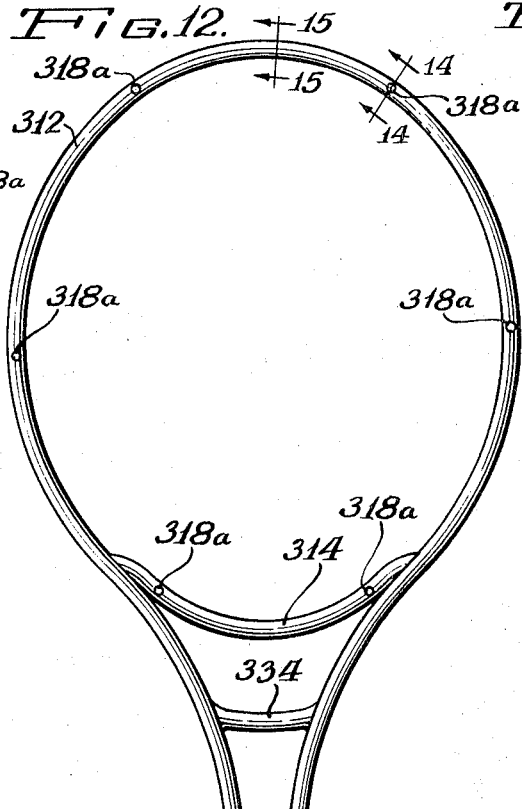
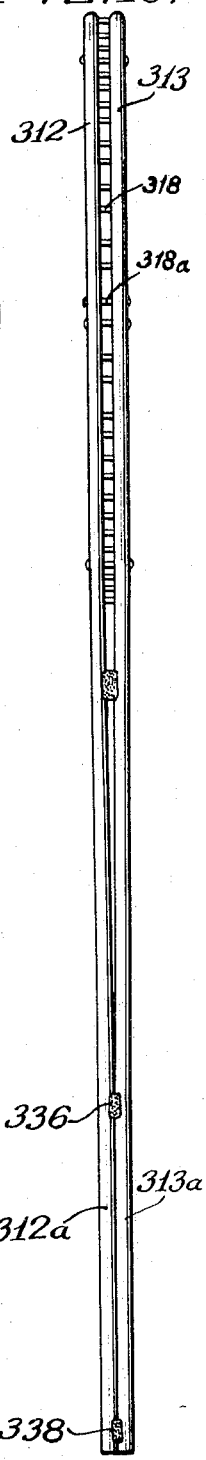
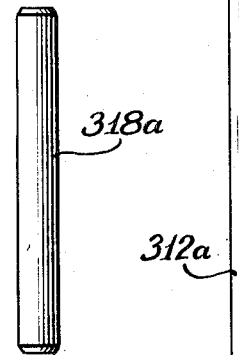
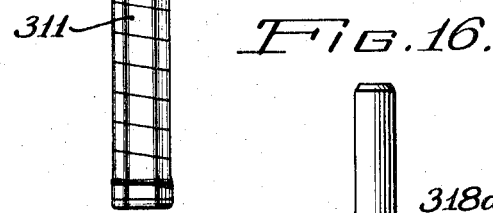
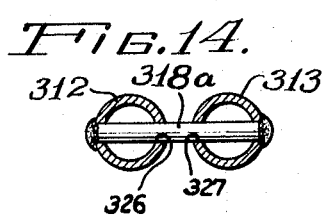
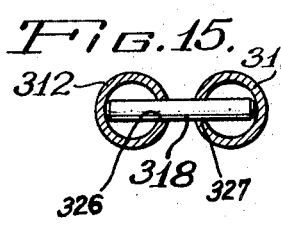
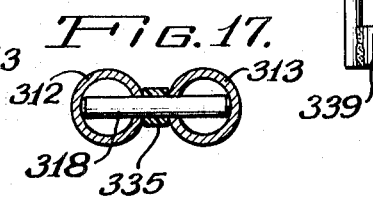
Inventors:
Maynard H. Cheris
Aloise A. Bigos
By Bair, Freeman & Molinare
Attys.

United States Patent Office 3,528,658
Patented Sept. 15, 1970

3,528,658
RACKET AND METHOD OF MAKING SAME
Maynard H. Cheris and Aloise A. Bigos, Chicago, Ill., assignors, by mesne assignments, to Charger Corporation, Chicago, Ill., a corporation of Illinois
Continuation-in-part of application Ser. No. 685,011, Nov. 22, 1967. This application Mar. 6, 1968, Ser. No. 710,795
Int. Cl. A63b 59/00
U.S. Cl. 273—73                                    15 Claims

ABSTRACT OF THE DISCLOSURE

A racket for tennis and the like game comprising a pair of like metal tubes looped intermediate the ends to form a head and secured to a handle adjacent the ends, with string support pin means retained between the spaced metal tubes to provide support for the string adapted to be tensioned thereon and to rigidify the racket head. Selected pin means are welded to the tubes to secure the tubes to one another. The ends of the selected pin means are chamfered to provide a more desirable weld between the pin means and the tubes. A cross-brace is provided in the throat area to further rigidify the frame. Bushings may be provided on the string support pin means to permit more uniform tensioning of the string in the racket.

---

This application is a continuation-in-part of our application Ser. No. 685,011 filed Nov. 22, 1967.

BACKGROUND OF THE INVENTION

This invention relates to rackets for tennis or the like game and, more particularly, to improve metal frame rackets.

The frames of rackets for tennis, badminton, squash and the like have generally been made of layers or plies of wood secured to one another and suitably shaped. Usually, the racket frames are substantially rectangular in cross-section. In the past, it has been suggested that metal rods be used in place of wood. However, such rods, round or oval in cross-section did not prove successful as the racket did not produce the desired "play."

More recently, a racket frame constructed from a metal channel in the form of two spaced beads interconnected by an integral web has been suggested. Holes for the strings are drilled in the web or alternatively, it was suggested that an auxiliary frame be provided for support of the strings. Reference may be made to Lacoste Pats. 3,086,777 and 3,206,203 for this type of racket.

The separate forming of holes in the frame is undesirable in that it adds unnecessary expense, and if any edge is ragged, the string may wear or be cut and will break prematurely. The affixation of a separate auxiliary frame to the main racket frame is undesirable in that it unnecessarily adds to labor and therefore, expense of fabrication. Furthermore, such auxiliary frame is more resilient than the main frame, and the uniform and proper tensioning of the strings is made difficult. Stringing of a metal racket frame employing an auxiliary frame is more time consuming than stringing of a more conventional racket having a wood frame.

An object of the present invention is to provide an improved metal racket frame comprised of two loops of tubular metal members joined by string support pins to form a string suspension system that provides for substantially uniform string tensioning.

Another object of the present invention is to provide an improved racket for tennis or the like game comprising a frame formed by a pair of like tubular members bent intermediate the ends to define a loop, the tubular members being spaced apart by pin means which form supports for the string tensioned in the frame.

A further object of the present invention is to provide an improved arrangement for joining two metal tubular members to one another by spaced pins to form a racket frame, with a cross-brace being provided in the throat area and with the frame end portions being rigidly joined to make the frame more resistant to bending and twisting without sacrificing desirable flex.

Yet another object of the present invention is to provide an improved metal frame racket having a cross-brace provided proximate the balance point of the racket, with means for varying the weight of the cross-brace to vary the weight of the racket without materially altering the balance of the racket.

Still another object of this invention is to provide an improved metal frame racket comprised of a pair of tubes shaped to form a racket head, with support pins disposed between the tubes to space the tubes and to secure them to one another, and with rotatable bushings or glides on the support pins, the string being disposed on the bushings or glides in a uniformly tensioned manner. Other objects and advantages of the present invention will become more apparent hereafter.

BRIEF DESCRIPTION OF THE DRAWING

Referring to the drawing, there is illustrated presently preferred embodiments of the present invention wherein:

FIG. 1 is a front view of the racket of the present invention with the string in place, and with a portion of the frame broken away to better show the string support pin means therein;

FIG. 2 is a side view of the racket of FIG. 1;

FIG. 3 is a detail view of the top portion of the head of the racket of FIG. 1;

FIG. 4 is a plan view of the top portion of the head of the racket shown in FIG. 3, with part being broken away for clarity;

FIG. 5 is a detail view of a portion of the racket frame illustrating the connection of the loop-closing frame members to the outer tubular frame members;

FIG. 6 is a cross-sectional view of the racket frame taken generally along the line 6—6 of FIG. 5;

FIG. 7 is a cross-sectional view taken generally along the line 7—7 of FIG. 3 and illustrating a form of string-support pin used to space the pair of frame members from one another;

FIG. 8 is a cross-sectional view taken generally along the line 8—8 of FIG. 3 and illustrating a weld for retaining the adjacent pair of frame members in spaced-apart relationship;

FIG. 9 is a cross-sectional view similar to FIG. 7 illustrating a modified form of string-support pin arrangement wherein the pins themselves are secured to the frame members;

FIG. 10 is a further modification of the string-support pin means wherein a separate spacer member is employed between the adjacent complementary frame members, and the ends of the pins are secured exteriorly of the frame members;

FIG. 11 is a front view of a modified racket embodying the present invention;

FIG. 12 is a front view of the frame of the modified racket of FIG. 11, with the handle being omitted to better illustrate the frame construction;

FIG. 13 is a side view of the frame of the modified racket of FIG. 11, with the handle being omitted;

FIG. 14 is a detail cross-sectional view taken generally along line 14—14 of FIG. 12;

FIG. 15 is a detail cross-sectional view taken generally along line 15—15 of FIG. 12;

FIG. 16 is an enlarged elevation view of a pin used in the modified racket of FIGS. 11–15; and FIG. 17 is a detail view similar to FIGS. 14 and 15 of a further modification wherein a bushing is provided on each string support pin.

DESCRIPTION OF PREFERRED EMBODIMENTS OF THE INVENTION

Referring to FIGS. 1 and 2, there is illustrated a racket 10 embodying the present invention. The racket is of the type that is utilized for tennis, badminton, squash and the like game. The racket 10 comprises a frame defined by a pair of metal tubular members 12 and 13 bent intermediate the lengths thereof to form a racket head, with the ends 12a and 13a of the tubular members being brought together in substantially parallel spaced relationship and secured to a handle 11 in a suitable manner. For example, the handle 11 may be formed from plastic having recesses for receiving the ends of rods 12, 13. A suitable leather hand-grip may be provided on the handle. The tubular members 12 and 13 are generally circular in cross section. The loop defined by tubular members 12, 13 is closed by means of a pair of separate brace or frame members 14 and 15 which are joined to the frame members 12 and 13 as will be more fully explained hereafter. The frame members 14, 15 are tubular and are preferably the same configuration and made from the same material as members 12, 13.

The complementary pair of frame members 12 and 13 and the complementary pair of frame members 14 and 15 are each maintained in spaced-apart relationship by means including cylindrical pins or rods 18 which provide supports for the string 20 and by means of the welds 22 disposed at radially spaced positions between the frame members 12, 13 and the frame members 14, 15. The pins 18 extend generally perpendicularly to the planes of the frame members.

The string 20 which may be formed from a suitable plastic such as nylon, or from animal gut is trained over the smooth exterior surfaces of the pins 18 to form the lattice work or longitudinally extending and transversely extending rows. The string is carried on the pins 18 and no additional means are required to provide smooth supports for the bends in the string. String 20 is suitably tensioned to give the desired play during a game and may be a single continuous piece or separate pieces secured in the racket frame.

It is to be noted in FIG. 2 that the tubes 12 and 13 are spaced apart slightly in the loop-defining portion or head portion of the frame and are brought together adjacent the handle 11. The inner faces of the tubes 12, 13 and 14, 15 are spaced to define passages between the tubes and pins to permit entry of the string therethrough during stringing of the racket. The distance between adjacent tubes 12, 13 and 14, 15 should be slightly greater than the diameter or maximum dimension of the string, but not too much larger as this might permit sidewise slipping of the string in use. The ends of the tubes 12, 13 are brought together adjacent the handle 11 causing a stressing of the tubes which has been found desirable in rigidifying the racket frame.

Referring now to FIGS. 3, 4, and 5, there is a better illustrated detail of the frame construction. The pins 18 are radially spaced about the periphery of the frame members 12, 13 and 14, 15 to provide supports for the string 20. The string 20 is trained over the spaced pins 18 to provide proper spacing of the string without putting any sharp bends in the string that might cause high stresses and premature string failure. As shown in FIG. 4, the pins 18 extend through openings 26, 27 in the inner facing surfaces of the frame members 12, 13 and function as spacers for suitably spacing the frame members 12 and 13 a predetermined distance from one another by engaging the inner wall of each frame member opposite from the opening. The tubes 12, 13 and 14, 15 are spaced apart a distance just slightly greater than the width of the stringing to facilitate initial stringing or subsequent re-stringing of the racket. The frame members may be secured to one another at spaced points about the periphery by welding or brazing to maintain the frame members 12, 13 and frame members 14, 15 in assembled relationship. When assembled, the pins further function to rigidify the frame and prevent twisting thereof in use.

With reference to FIG. 3, it is noted that the pins 18 are positioned in the frame members or tubes 12 and 13 a sufficient distance from the outer edge of the tubes such that the string 20 will be protected at all times in use. The exterior of the pins 18 is radially inward from the outer edges of the frames 12, 13 a distance greater than the thickness of the string 20. Should the player strike the ground with the racket, the impact will be taken up in the racket frame and the string 20 will be protected from damage by the adjacent edge portions of the frame members.

Referring to FIG. 5, it is seen that the frame members 14, 15 are welded to the frame members 12 and 13 at each end thereof to maintain the integrity of the loop defined by the intermediate portions of the frame members 12, 13. The ends of the members 14 and 15 may be closed by a suitable plug 25 made from plastic or the like material.

The frame members 12, 13 and 14, 15 are comprised of tubular metal pieces suitably formed to shape and retained in such desired shape by means of welding or brazing or the like. The racket head is generally circular or elliptical as viewed from the front. The pins 18 extending between the frame members 12, 13 and 14, 15 are smoothly machined and provide desirable supports for the strings which are tensioned thereon. Often the racket frame is sold separately and the purchaser has the option of selecting the type of string he prefers.

Referring to FIGS. 6, 7 and 8, there are illustrated details of construction of one form of frame of the present invention. In FIG. 6 there is shown a weldment 24 between the members 12, 13 and the members 14, 15. The members 12, 13 are maintained in spaced relationship uniformly about the entire frame portions and likewise the frame members 14, 15 are maintained in a similar spaced relationship. The singular weldment 24 between the four frames 12, 13, 14 and 15 at each end of the frame members 14, 15 provides for a secure connection between these members. The tubular frame members 12, 13, 14 and 15 and the pins 18 cooperate to provide a strong rigid racket head structure.

As shown in FIG. 7, holes 26 and 27 are provided in the frames 12 and 13 respectively. The holes are provided in the facing surfaces of the frame members 12 and 13, such that the pin 18 may extend through the openings to the interior of the tubular members 12 and 13 into abutment with the opposed wall surface portions. The length of the pins 18 are such as to give a predetermined spacing between the inner faces of the frame members 12 and 13. Therefore, upon securement of the frames 12 and 13 to one another as for example by welding or brazing, the frame members 12 and 13 will be maintained in uniform spaced relationship with the string support pins retained therebetween.

In FIG. 8 there is shown a cross-section of the frame taken generally along the line 8—8 of FIG. 3 and illustrating a weld 22. The welds 22 are at spaced intervals between the frame members.

The racket frame may be assembled in the following manner. A first frame member may be laid upon a support with the openings facing up. The pins 18 are inserted into the openings in the first frame member and the second frame member may be positioned over the first with the respective pin openings aligned to receive the pins therein. The frame members may then be welded at spaced intervals to secure the frame members and string-support pins in assembled relationship. Then the handle may be joined to the ends of the frame members to complete the assembly. Stringing can be done as desired using conventional string materials and methods.

Turning now to FIGS. 9 and 10, there are illustrated modified forms of means for connecting the pins within the adjacent pairs of frame members. It will be understood that the frame members 112 and 113 are substantially the same in cross-section and outer configuration as frame members 12 and 13. The pins 118 in such frame extend through openings 126 and 127 in the opposed inner surfaces of the frame members 112, 113. The ends of selected pins 118 may be welded or otherwise rigidly joined to the frame members as indicated at 130. It will be sufficient in this form of the invention if six or eight pins are welded to the frame members 112 and 113 to retain the pins in assembled relationship and to maintain the desired spacing between adjacent frame members. It will be understood that several of the pins 118 extending through the brace frame members or frame portions closing the loop will similarly be secured to provide the desired predetermined spaced relationship between assembled brace frame members. If desired, the welds 22 of the embodiment of FIGS. 1-8 may be omitted from a racket embodying the form of pin arrangement shown in FIG. 9.

In FIG. 10 there is illustrated a further modification wherein a pin 218 extends entirely through openings 226, 228 and 227, 229 in the frames 212 and 213, respectively. An annular spacer member 232 is provided between the frame members 212, 213 and is carried on the pin 218 in order to maintain the spaced relationship between the frame members. The ends of the pins may be peened over or the material of the ends may be displaced as indicated at 231 in order to secure the pin in place between the frame members 212 and 213 to secure the frame members in desired spaced relationship to one another. Likewise, as noted with respect to the embodiment of FIG. 9, the welds 22 may be omitted in certain designs.

Referring now to FIGS. 11-16, there is illustrated a further racket modification embodying the present invention. The racket of FIGS. 11, 12 and 13 incorporates a frame defined by a pair of like symmetrical metal tubular members or tubes 312 and 313 curved to form a bow or racket head and pairs of tube ends 312a and 313a which are brought together in substantially parallel spaced relationship and are secured to handle 311. The tubes may be formed from a steel alloy. The handle 311 is preferably formed from two like molded plastic pallet pieces and an end cap or butt piece as shown, for example, in the copending patent application of Maynard H. Cheris, Aloise A. Bigos and Dana W. Mox, Ser. No. 685,011, filed Nov. 27, 1967. A suitable flexible strip of material as, for example, calf skin is provided on the handle to form a hand grip. The loop defined by the tubular members 312 and 313 is closed by a pair of brace or frame members secured at their ends to respective frame members 312, 313. Only one brace 314 is shown in FIG. 11.

The complementary pairs of frame members 312, 313 and 314 are maintained in spaced-apart relationship by cylindrical pins or rods made from a suitable rigid material having requisite strength, preferably steel, which provide supports for the string 320 and form a string suspension system. As in the modification of FIGS. 1 and 2, the tubes 312, 313 and 314 are spaced apart slightly in the loop defining portion or head portion of the frame to receive strings and the tubes 312, 313 are brought together in the handle area of the racket.

Provided in the throat area of the racket frame is a tubular cross-brace or cross-piece 334. The cross-piece 334 is rigidly secured at each end to the tubes 313, 313 as by welding and functions to rigidify the racket frame. Also, by virtue of its location in the throat area, the cross-brace 334 prevents a tennis ball from lodging between the frame members 312, 313, 314. The cross-brace 334 may be made from a tubular metal piece which can be filled with a weighted mass, as, for example, lead, to vary the weight of the tennis racket. By virtue of the location of the cross-piece 334 close to the balance point (which is slightly below the cross-brace as viewed in FIG. 11), the racket may be desirably weighted without materially affecting the balance thereof.

It is a feature of the present invention that the frame be rigid so that it is highly resistant to bending and twisting, yet without sacrificing needed flex. In the head area, the pairs of spaced tubular members 312 and 313 and the brace members 314 are each retained together by selected pin members. The brace members 314 are each rigidly secured at their ends to a respective frame member 312, 313 as, for example, by welding. In the throat area the cross-brace or cross-piece 334 provides reinforcement for the frame. The cross-piece 334 is welded at each end to the frame members 312, 313. The frame end portions 312a, 313a are welded to one another in the intermediate handle area as indicated at 336 (FIG. 13) and adjacent the extremities, as indicated at 338 (FIG. 13), and to a U-shaped cross-piece 339 (FIG. 12) which maintains the frame end portions 312a and 313a in predetermined spaced-apart relationship. The openings in the arms in the U-shaped cross-piece or clip member 339 cooperates with a projection on each handle pallet piece to secure the handle 311 (FIG. 11) to the frame in such manner as to prevent longitudinal movement of the handle with respect to the frame.

Referring now to FIGS. 14 and 15, there is illustrated detailed sectional views of the support pin means of the modification of FIGS. 11-13. The string support pins are of two types. This pins 318 (FIG. 15) extend through openings 326, 327 in the adjacent facing surfaces of the frame members 312, 313 and function to space the frame members one from the other. The pin members 318a are longer than pins 318 and extend through openings 326, 327 extending entirely through the tubes or frame members 312, 313 and are rigidly affixed to the frame members so as to provide a rigid connection of the frame members 312, 313 to one another. With reference to FIG. 11, it is seen that there are four pin members 318a securing the frame members 312, 313 to one another and two pin members 318a securing the brace members 314 to one another. The remaining pins 318 function to space the frame members 312, 313 and cross-members 314 from one another.

In FIG. 16, there is illustrated a pin 318a. It is noted that the pin is substantially cylindrical but that the ends thereof are chamfered at a 45° angle. In manufacture, it has been found that a cylindrical pin squared at the ends did not produce a satisfactory weld, whereas a chamfered pin produced a sound weld with a rounded head that required a minimum of cleaning to provide a finished product. A 45° chamfer has been found to be most desirable.

With reference to FIG. 17, there is illustrated yet another modification of the racket of the present invention wherein each of the pin supports of the spring suspension system is provided with a glide or bushing 335 thereon.

The bushing 335, which is preferably made from plastic such as nylon, is movable or rotatable on the support pins. The string engages the smooth curved exterior of the bushings. Increased tensioning of the strings can be accommodated and the bushings provide means for equalizing tension of the racket strings. The racket string or strings are uniformly and consistently tensioned with the desired result that there is a uniform lively feel across the entire hitting area and there is no dead area. A tennis ball will be readily returned whether it be struck dead center in the racket or more closely adjacent the racket frame—there is no penalty for hitting the ball off-center.

There is provided by the present invention a simplified metal racket frame construction that is readily fabricated. String-support pins having smooth exterior surfaces are provided to space the complementary frame members from one another and to support the string to be tensioned thereon. The completed racket frame is relatively rigid and thus, the strings (either gut or plastic, for example, nylon) can be properly tensioned, whereas in prior constructions utilizing an auxiliary frame about the inner periphery of the outer frame it is quite difficult to maintain the desired string tension and to provide uniformity of string tensioning.

The racket of the present invention is characterized by a rugged frame formed by two metal tubular spaced-apart members rigidly connected to one another by string support pins, which frame is resistant to bending and twisting, while maintaining desired flex. The throat area is open whereby air resistance is minimized and the racket can be swung quickly with a minimum of effort to achieve hard stroking or return of the ball. Little shock or vibration of hitting a ball is transmitted from the racket to the arm of a player.

A cross-piece or cross-brace is provided to rigidify the throat area of the frame and to prevent a tennis ball from lodging in this area. The cross-piece is located near the balance point of the racket and can be weighted to change the weight of the racket without adversely shifting the balance point of the racket.

The glides or bushings increase the bearing surface for the strings without increasing the hole size in the frame members and thereby weakening the frame members. Rotation of the bushings on the support pins provides for uniform tensioning of the string or strings over the entire face of the racket head. Stringing of the racket is facilitated. In this regard, it is noted that the support pins 318a in the embodiment shown in FIGS. 11–13 may serve as reference points for starting or stringing and for string tie-off points.

We claim:

1. A racquet for tennis and the like game comprising a pair of like symmetrical tubular frames curved intermediate the ends to form a loop-defining head, the end portions of the frames being joined to handle means, a pair of curved tubular members joined to each of said frames to form a closed loop, and string-support pin means disposed between the pair of frames and the pair of tubular members for providing supports for the string adapted to be tensioned thereon, said frames and said members being provided with like openings extending oppositely from adjacent surfaces, with pin means being disposed in said openings and retained therein, said pin means including spacer pins and other pins, the other pins being secured to said frames and tubular members at the outer, non-adjacent surfaces of said frames and tubular members for retaining the frames and tubular members, respectively, in fixed spaced-apart relationship, the pin means forming a string-suspension system whereby the string is supported on adjacent pairs of pin means and with separate means further securing said frames and tubular members at spaced points about the periphery.

2. A racquet as in claim 1 wherein the end portions of said frames are rigidly secured in parallel spaced-apart relationship by brace means adjacent the ends thereof, with the frame end portions comprising the pairs being joined adjacent the ends and in the handle area remote from the ends of the frame end portions.

3. A racquet as in claim 2 wherein the first pair of frames converge toward one another in the throat area of the racket frame between the head and the frame end portions, and a cross-piece is disposed in the throat area and secured at its ends to rigidify the frame.

4. A racquet as in claim 3 wherein the cross-piece is proximate the balance point of the racket and the weight of the cross-piece can be varied to vary the weight of the racket without materially altering the balance point of the racket.

5. A racquet as in claim 1 wherein said other pins are initially provided with chambered ends which when welded in place form clean rounded heads without splatter of weld material.

6. A racquet as in claim 5 wherein the chamfered ends are chamfered at a 45° angle.

7. A racquet as in claim 1 wherein bushings are rotatably carried on each pin means, said bushings being annular and being adapted to carry string thereon, the bushings being movable to provide for uniform tensioning during stringing and subsequently in use.

8. A racquet as in claim 1, wherein selected ones of said openings extend entirely through said frames and said other pins are disposed in said openings and extend entirely through said frames.

9. A racquet as in claim 1, wherein other of said openings extend through only one side of each frame and said spacer pins are disposed in said other of said openings and abut a wall of each of the frames so as to space the frames apart.

10. A racquet as in claim 9, wherein said spacer pins extend through said other of said openings in each frame and abut an inner wall of each frame.

11. A racquet as in claim 1, wherein the spacer pins and other pins are spaced radially about the frames and are disposed generally at right angles to a plane passing longitudinally through the racquet.

12. A racquet as in claim 11, wherein the spacer pins and other pins are spaced inwardly from the outer edges of the frames, with the radial distance from the exterior of the pins to the outer edges being greater than the width of the string so as to protect the string.

13. A method of fabricating a racket frame comprising curving predetermined lengths of tubular metallic frame members intermediate the ends thereof to form a loop-defining head and spaced-apart frame end portions, said loop defining head having spaced openings therein, with a throat area defined between the head and the frame end portions, securing a tubular loop-closing frame member to each of said first frame members to form the head, spacing a pair of like tubular frame members from one another in generally parallel spaced-apart relationship in the head region by pin means disposed in said openings and in abutting relationship in the region of the frame end portions, said pin means being at spaced intervals between the frame members, the pin means being of two lengths, spacer pins being of a shorter length for spacing the frame members and other pins being of a longer length, welding the ends of said other pins to the frame members to retain them in asembled relationship, securing separate means to said frame members to further connect said frame members to one another at spaced points about the periphery securing brace means to the spaced-apart frame end portions to maintain them in predetermined spaced relationship to one another and affixing a handle to said frame end portions.

14. A method as in claim 13, including the step of securing a cross-piece in the throat area between the pairs of frame members to rigidify the frame.

15. A method as in claim 14 including the step of weighting the cross-piece to vary the weight of the racket.

References Cited

UNITED STATES PATENTS

| | | | |
|---|---|---|---|
| 240,183 | 4/1881 | Richardson | 273—73 |
| 1,937,787 | 12/1933 | Robinson | 273—73 |
| 3,206,204 | 9/1965 | Lacoste | 273—73 |

FOREIGN PATENTS

| | | |
|---|---|---|
| 3,715 | 9/1926 | Australia. |
| 208,945 | 7/1957 | Australia. |
| 219,535 | 7/1924 | Great Britain. |
| 315,046 | 7/1929 | Great Britain. |
| 690,270 | 4/1953 | Great Britain. |
| 639,932 | 3/1928 | France. |
| 237,935 | 7/1925 | Great Britain. |

RICHARD C. PINKHAM, Primary Examiner

RICHARD J. APLEY, Assistant Examiner